US009862296B2

(12) United States Patent
Parlow et al.

(10) Patent No.: US 9,862,296 B2
(45) Date of Patent: Jan. 9, 2018

(54) CUP HOLDER SYSTEM FOR A MOTOR VEHICLE

(71) Applicant: FORD GLOBAL TECHNOLOGIES, LLC, Dearborn, MI (US)

(72) Inventors: Kathleen M. Parlow, Columbus, MI (US); John Louis Miklas, Clinton Township, MI (US); Nicholas Alphonse Billardello, Macomb, MI (US); David Frederick Lyons, Jr., New Haven, MI (US); Anthony Michael Zingalie, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 14/621,500

(22) Filed: Feb. 13, 2015

(65) Prior Publication Data
US 2016/0236604 A1    Aug. 18, 2016

(51) Int. Cl.
*B60N 3/10*    (2006.01)
*B60N 2/70*    (2006.01)

(52) U.S. Cl.
CPC ............. *B60N 3/103* (2013.01); *B60N 2/70* (2013.01); *B60N 3/102* (2013.01)

(58) Field of Classification Search
CPC ........ B60N 3/103; B60N 3/102; B60N 3/106; B60N 3/108; B60N 2/4686; B60N 2/70
USPC ......................................................... 224/544
See application file for complete search history.

(56) References Cited

U.S. PATENT DOCUMENTS

| 5,248,183 | A | * | 9/1993 | Gignac | B60N 3/102 248/311.2 |
|---|---|---|---|---|---|
| 5,286,084 | A | | 2/1994 | Bart | |
| 5,316,368 | A | * | 5/1994 | Arbisi | B60N 3/102 224/275 |
| 6,139,096 | A | * | 10/2000 | Anderson | B60N 2/462 297/144 |
| 6,217,112 | B1 | | 4/2001 | Linsenmeier et al. | |
| 6,427,960 | B1 | * | 8/2002 | Gehring | B60N 2/4686 224/926 |
| 6,547,326 | B1 | | 4/2003 | Walkinshaw et al. | |
| 7,341,297 | B2 | * | 3/2008 | Nakamura | B60N 3/083 224/926 |

(Continued)

FOREIGN PATENT DOCUMENTS

| DE | 102007058763 A1 | 6/2009 |
|---|---|---|
| DE | 102009012810 A1 | 10/2009 |
| KR | 0161179 B1 | 12/1998 |

OTHER PUBLICATIONS

English translation for DE102007058763.
English translation for DE102009012810.

*Primary Examiner* — Corey Skurdal
(74) *Attorney, Agent, or Firm* — Vichit Chea; King & Schickli, PLLC

(57) ABSTRACT

A cup holder system is provided for a motor vehicle. The cup holder system includes a storage bin having a housing and a cover. Further the cup holder system includes a cup holder, a first mounting feature in the storage bin for receiving and holding the cup holder in a first use position and a second mounting feature at a second location in the motor vehicle outside the storage bin for receiving and holding the cup holder in a second use position.

13 Claims, 14 Drawing Sheets

(56) References Cited

U.S. PATENT DOCUMENTS

| | | | |
|---|---|---|---|
| 7,344,056 B2* | 3/2008 | Shelmon | B60N 3/002 220/8 |
| 9,428,092 B2* | 8/2016 | Bosma | B60N 3/103 |
| 9,561,753 B1* | 2/2017 | Mendoza Vera | B60R 7/04 |
| 2007/0221804 A1* | 9/2007 | Harshman | B60N 3/106 248/311.2 |
| 2008/0169667 A1 | 7/2008 | Siniarski et al. | |
| 2008/0296923 A1* | 12/2008 | Hirata | B60N 3/101 296/37.12 |

* cited by examiner

CUP HOLDER SYSTEM FOR A MOTOR VEHICLE

TECHNICAL FIELD

This document relates generally to the motor vehicle equipment field and, more particularly, to a cup holder system incorporating a storage bin and a cup holder wherein one possible embodiment includes mounting features that allow the cup holder to be mounted in the storage bin or other locations within the motor vehicle.

BACKGROUND

Cup holders are a greatly appreciated convenience in many of today's motor vehicles. Cup holders can be provided in a variety of places in a motor vehicle including, for example, the center console and in the door armrests.

Providing a cup holder at a convenient and accessible location for the rear seat occupants of a motor vehicle is more problematic. Seating space requirements may prevent the provision of a cup holder in the door armrests. While the provision of a cup holder at the rear of the center console is possible, it should be appreciated that such a cup holder may be difficult to reach for outboard rear seat passengers. This is particularly true if they are children or are otherwise small in stature.

U.S. Pat. No. 6,217,112 discloses a cup holder provided in the rear seat armrest of the vehicle. While such a cup holder may be conveniently accessed by outboard rear seat passengers, it should be appreciated that such a cup holder is effectively rendered useless when the armrest is stowed in the rear seatback in order to accommodate a third, middle rear seat, passenger. U.S. Pat. No. 6,547,326 discloses the concept of providing a flip out cup holder in the middle seat cushion of the rear seat. While such a cup holder is easily accessed by the outboard rear seat passengers, the cup holder cannot be used when the vehicle must accommodate a third, middle rear seat passenger.

This document relates to a new and improved cup holder system for a motor vehicle with enhanced versatility. Such a cup holder system includes a storage bin in the rear seat cushion that may be opened to expose a cup holder that is easily accessed by outboard rear seat passengers. In the event the storage bin must be closed in order to account for a third, middle rear seat passenger, the cup holder may be removed from the bin and positioned at a second location in the motor vehicle outside the storage bin that is easily accessed by the rear seat passengers. This is not possible with the permanent rear seat cup holders mounted in the rear seat armrest and middle seat cushion disclosed in U.S. Pat. Nos. 6,217,112 and 6,547,326. Accordingly, the present cup holder system represents a significant advance in the art.

SUMMARY

In accordance with the purposes and benefits described herein, a cup holder system is provided for a motor vehicle. That cup holder system comprises a storage bin including a housing cover, a cup holder, a first mounting feature in the storage bin for receiving and holding the cup holder in a first use position and a second mounting feature at a second location of the motor vehicle outside the storage bin for receiving and holding the cup holder in a second use position.

In one possible embodiment the cup holder system further includes a third mounting feature in the storage bin for receiving and holding the cup holder in a storage position.

In one possible embodiment the first mounting feature is provided on the cover and receives and holds the cup holder in a first use position and the third mounting feature is provided on the housing. This mounting feature receives and holds the cup holder in a storage position within the storage compartment defined by the cover and the housing. The cover may be connected by a hinge to the housing so as to be displaceable between an open position and a closed position.

In one possible embodiment the cup holder comprises a rim and a flexible well for receiving and holding a cup. The rim may include a circular portion and a slot. The slot provides clearance for receiving a handle on a mug when a mug is held in the cup holder.

In one possible embodiment the storage bin includes an internal support wall. That support may include a notch. Accordingly, the cup holder may be supported between the first mounting feature and the support.

In such an embodiment, the cup holder may include first and second mounting lugs. The first mounting lug engages the first mounting feature while the second mounting lug engages the notch in the support wall when the cup holder is held in the first use position. Still further, the first mounting lug may be formed as a tapered dovetail and the first, second and third mounting features may be formed as cooperating tapered dovetail receivers.

In one possible embodiment the third mounting feature includes a resilient lock for positively holding the cup holder in the storage position within a compartment defined by the cover in the housing.

In accordance with an additional aspect, a cup holder system for a motor vehicle comprises a storage bin including a cover and a housing defining a storage compartment. The cup holder system further includes a cup holder, a first mounting feature in the storage bin for receiving and holding the cup holder in the use position and a second mounting feature in the storage bin for receiving and holding the cup holder in a storage position. Still further, an outer surface of the cover may comprise a portion of a seat face and the storage bin may be mounted in a rear seat of the motor vehicle.

In accordance with yet another embodiment, the cup holder system comprises a storage bin, including a cover and a housing, and an articulated cup holder including a first section and a second section. A first hinge connects the first section to the cover while a second hinge connects the two sections together. A lock mechanism secures the articulated cup holder in a storage position wherein the articulated cup holder is held in a recess in the cover.

The system further includes a biasing element for biasing the articulated cup holder into a use position. When the articulated cup holder is in the storage position, the first and second sections are aligned in a first plane. In contrast, when in the use position, the first section is held in a second plane and the second section is held in a third plane, wherein the second plane is substantially perpendicular to the first plane and the third plane is offset from and parallel to the first plane.

Still further, the lock mechanism includes an actuator button having first and second opposed sidewalls, a first latch pin slidingly received in a first slot in the first sidewall and a second latch pin slidingly received in a second slot in the second sidewall. The first and second opposed sidewalls diverge from each other whereby when the actuator button is depressed, the first and second latch pins are drawn together so as to be released from locking apertures in the cover. A spring biases the lock mechanism into the locked position.

In the following description, there are shown and described several preferred embodiments of the cup holder system. As it should be realized, the cup holder system is capable of other, different embodiments and its several details are capable of modification in various, obvious aspects all without departing from the cup holder system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cup holder system and together with the description serve to explain certain principles thereof. In the drawing figures.

Reference will now be made in detail to the present preferred embodiments of the cup holder system, examples of which are illustrated in the accompanying drawing figures.

DETAILED DESCRIPTION

Figure 1:
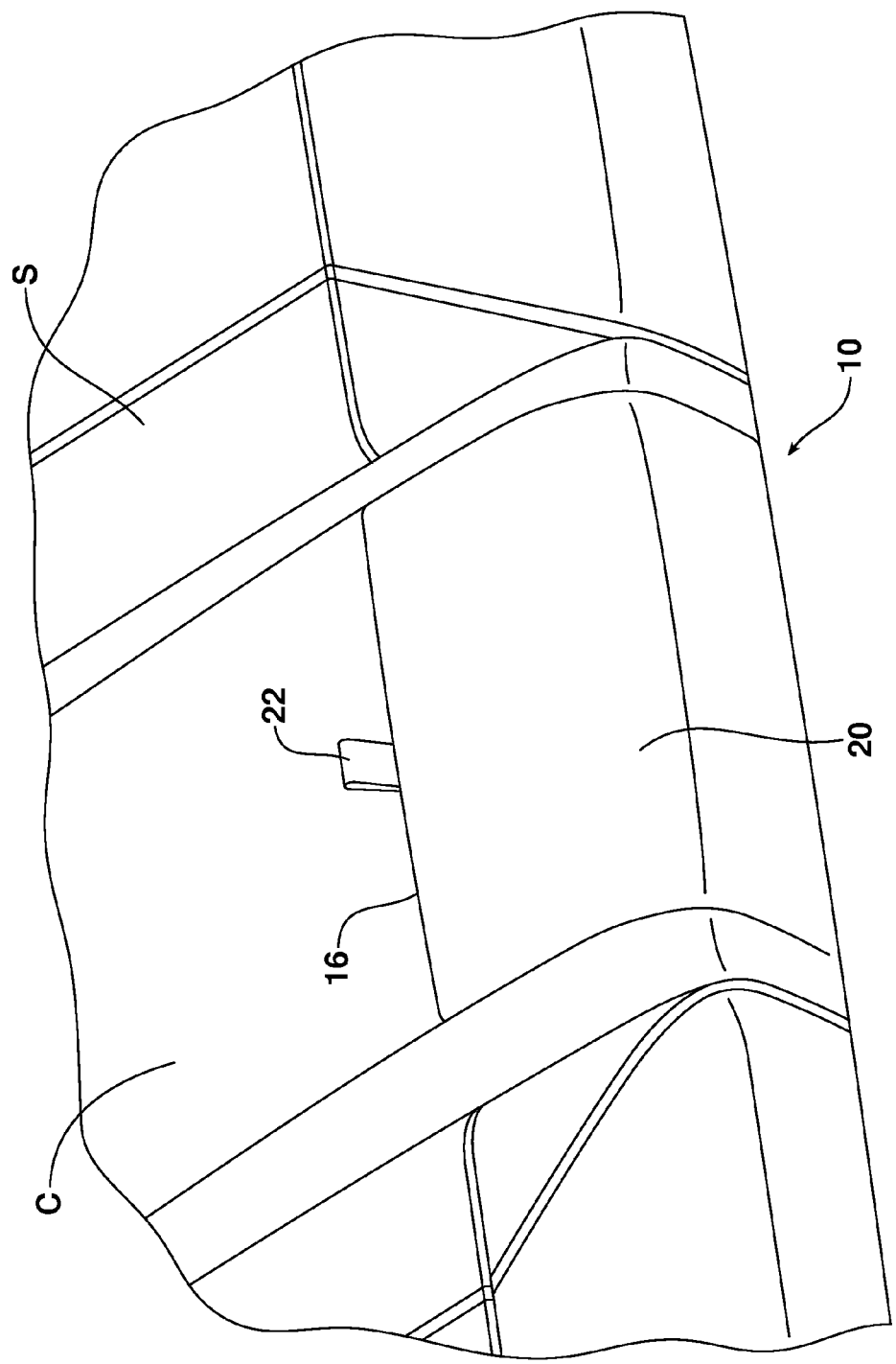
FIG. 1 is a perspective view illustrating the storage bin of the cup holder system positioned in the rear seat face of a vehicle with the outer surface of the closed cover forming a portion of the middle seat cushion.
Figure 2:
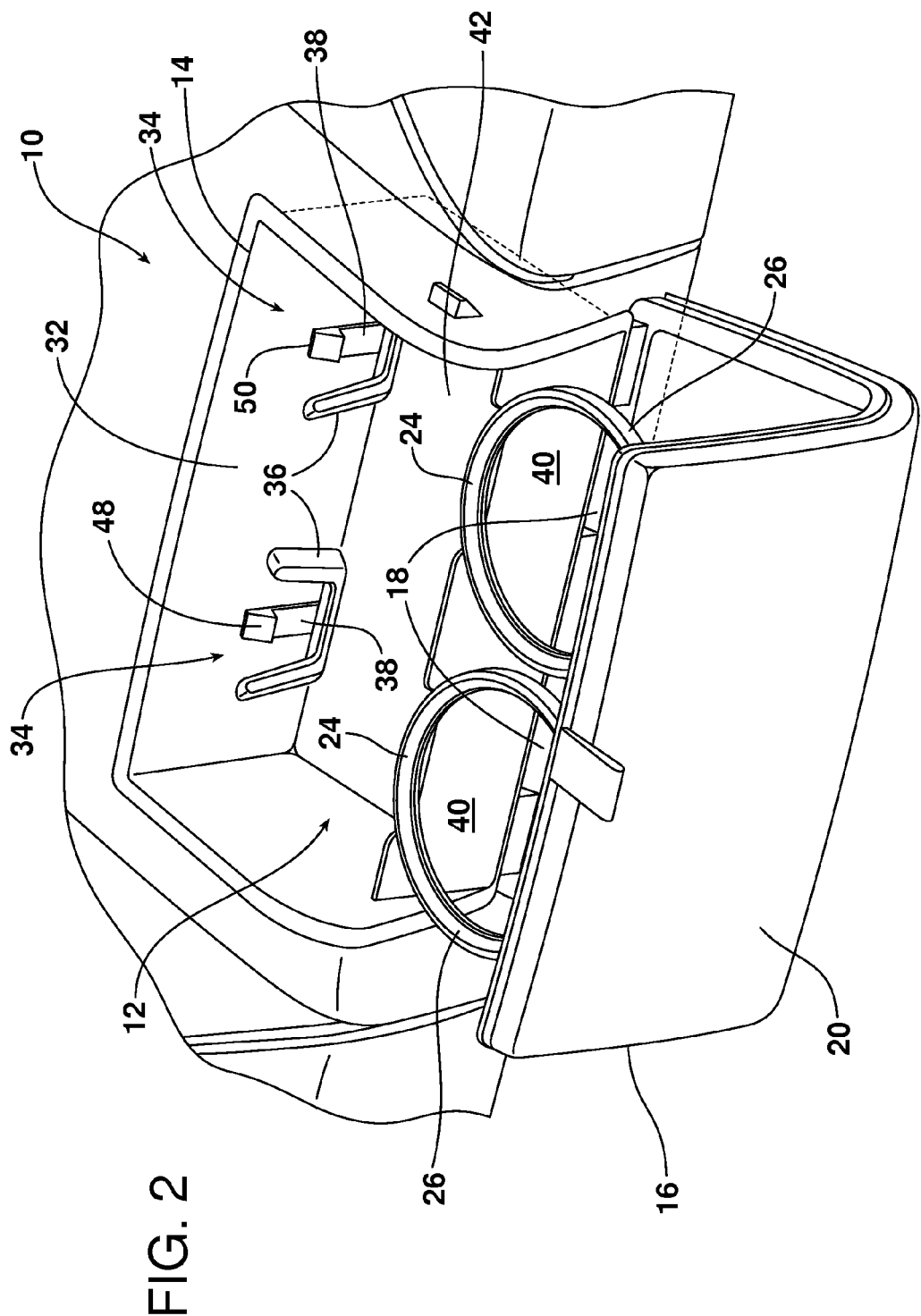
FIG. 2 is a perspective view illustrating the cup holder system with the hinged cover open to expose the storage bin and two individual cup holders in a first use position.

Reference is now made to FIGS. 1-13b illustrating various embodiments of the cup holder system 10 for a motor vehicle. As best illustrated in FIGS. 1 and 2, the cup holder system 10 includes a storage bin 12 comprising a housing 14 and a cover 16. As illustrated in FIG. 2, the cover 16 is connected to the housing 14 by means of hinges 18 and is displaceable between the closed position illustrated in FIG. 1 and the open position illustrated in FIG. 2. As illustrated in those figures, the cup holder system 10 may be incorporated into the front center portion C of the rear seat S of a motor vehicle. Thus, the outer surface of the cover 16 may be made from the same material and form a portion 20 of the seat face. Thus, when the cover 16 is closed as illustrated in FIG. 1, a continuous seating surface is provided for a third person to sit in the middle of the rear seat S. A tab 22 made of soft flexible cloth or other appropriate material is connected to the cover 16 and is exposed when the cover 16 is closed (see FIG. 1). One simply engages the tab 22 to pivot the cover 16 about the hinges 18 and displace the cover into the open position illustrated in FIG. 2.

Figure 3:
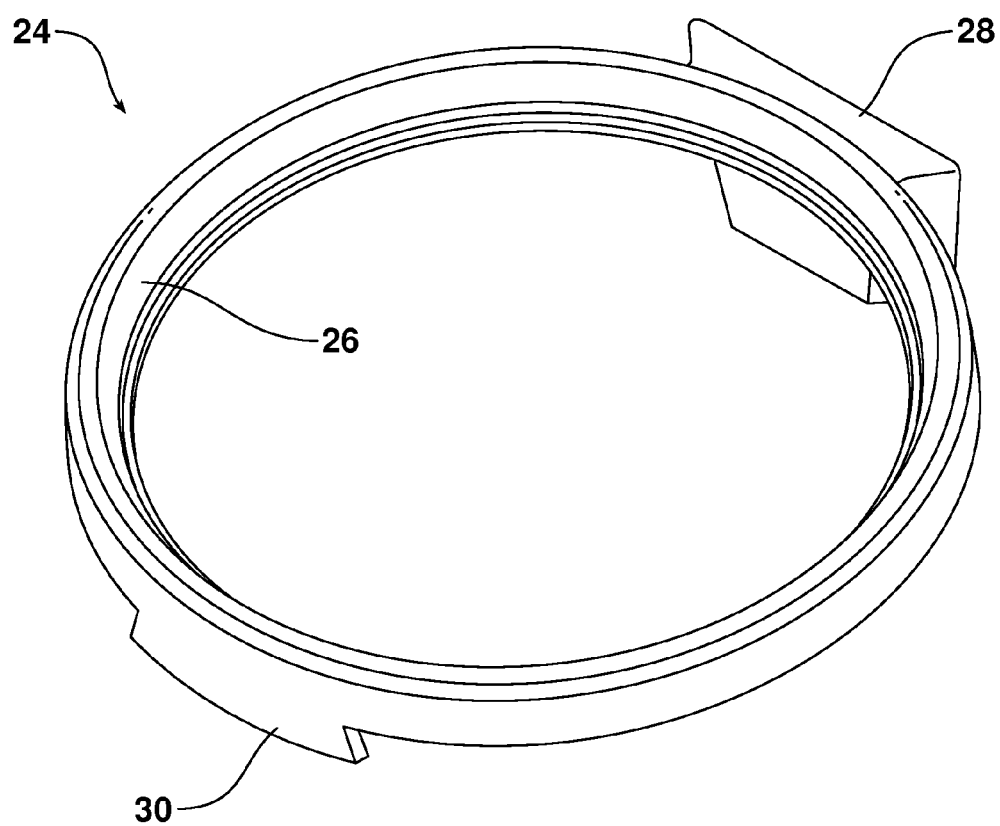
FIG. 3 is a perspective view illustrating the first and second mounting lugs provided on the rim of the cup holder.

The cup holder system 10 also includes one or more cup holders 24. More specifically, the embodiment illustrated in FIG. 2 includes two cup holders 24. As illustrated in FIG. 3, each cup holder 24 comprises a circular rim 26 including a first mounting lug 28 and a second mounting lug 30. In the illustrated embodiment the first mounting lug 28 is formed as a tapered dovetail. Further, the first and second mounting lugs 28, 30 are provided opposite each other on the circular rim 26. As illustrated in FIG. 2, the wall 32 of the housing includes two mounting features 34. Each mounting feature 34 comprises a tapered U-shaped rib 36 and a cooperating resilient latching tab or lock 38.

Figure 4:
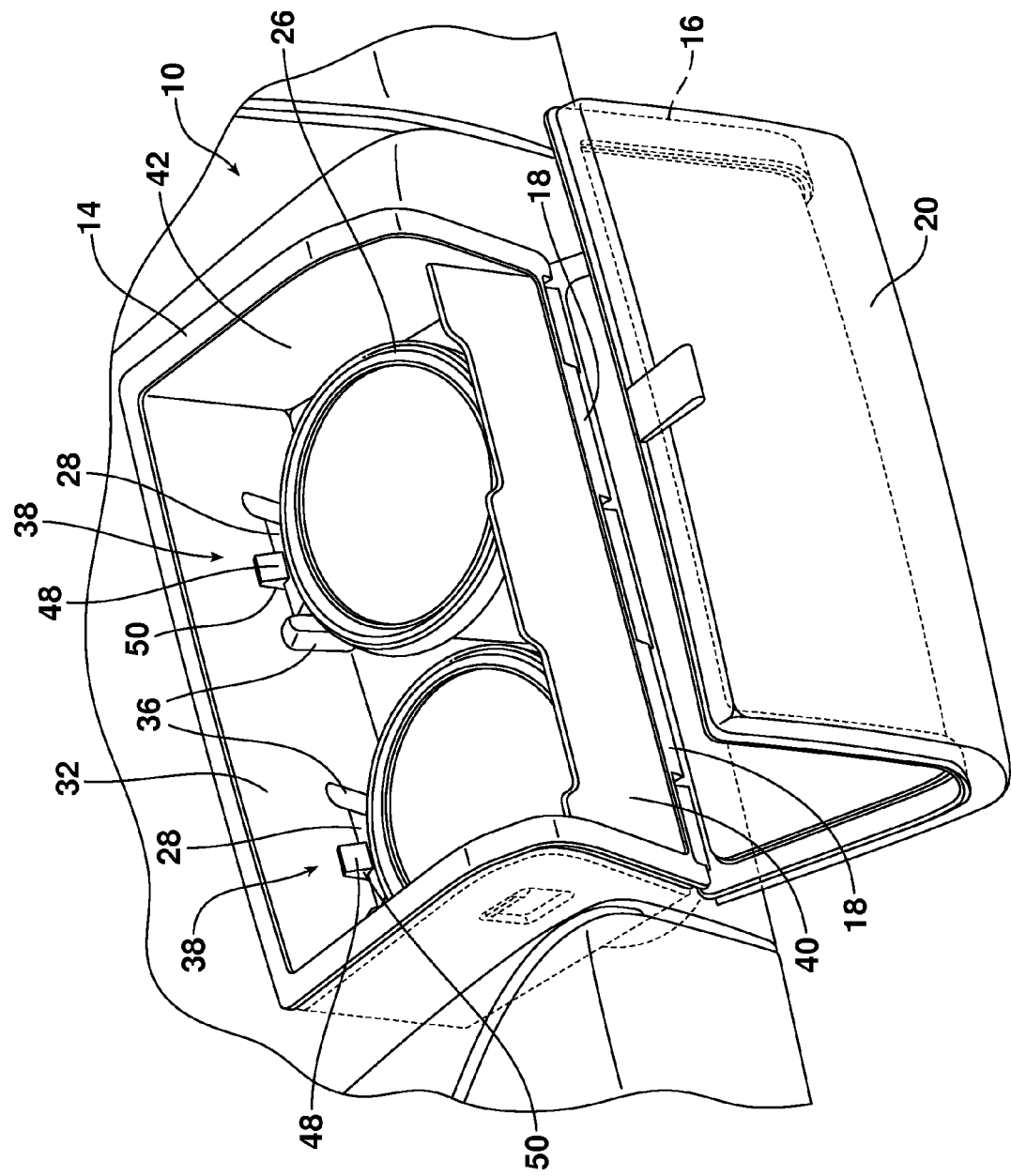
FIG. 4 is a detailed perspective view illustrating two cup holders positively locked in a storage position in the bottom of the storage bin compartment.

An internal support wall 40 is provided in the housing 14 opposite the wall 32. As should be appreciated, the housing 14 and the cover 16 define a storage compartment 42. As best illustrated in FIG. 4, when not in use, the two cup holders 24 may be stored in the storage compartment 42 between the wall 32 and the support wall 40. More specifically, the first mounting lug 28 of the cup holder 24 is secured in one of the mounting features 34. This is done by inserting the tapered dovetail margin of the mounting lug 28 into the cooperating groove formed between the tapered U-shaped rib 36 and the wall 32. As the mounting lug 28 is being inserted in the mounting feature 34, the lug engages the cam surface 48 of the locking tab 50 thereby forcing the resilient lock 38 to retract and allowing the mounting lug 28 to be pushed down into and fully seated in the mounting feature 34. At that point the locking tab 50 is clear of the mounting lug 28 and the resilient lock 38 springs back into its rest position with the locking tab 50 overlying the upper edge of the mounting lug 28 thereby positively holding the cup holder 24 in the storage position at the bottom of the storage compartment 42 between the walls 32 and 40. Here it should be appreciated that the cup holders 24 do not fill the storage compartment 42 and that compartment may be utilized to store other items as desired while still allowing the cover 16 to be closed as illustrated in FIG. 1.

Figure 5:
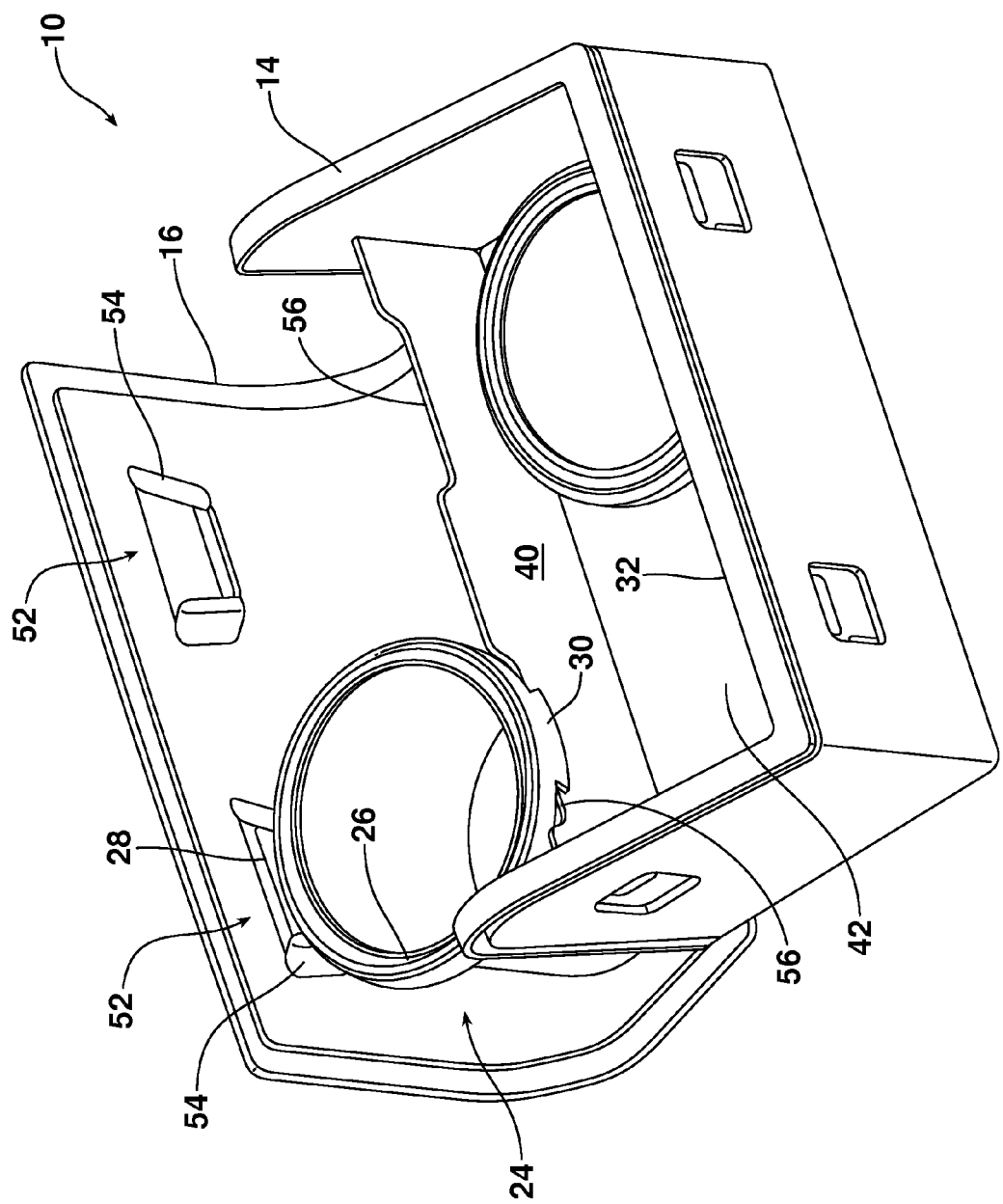
FIG. 5 is a perspective view illustrating one cup holder in the use position and one cup holder in the storage position.
Figure 6:
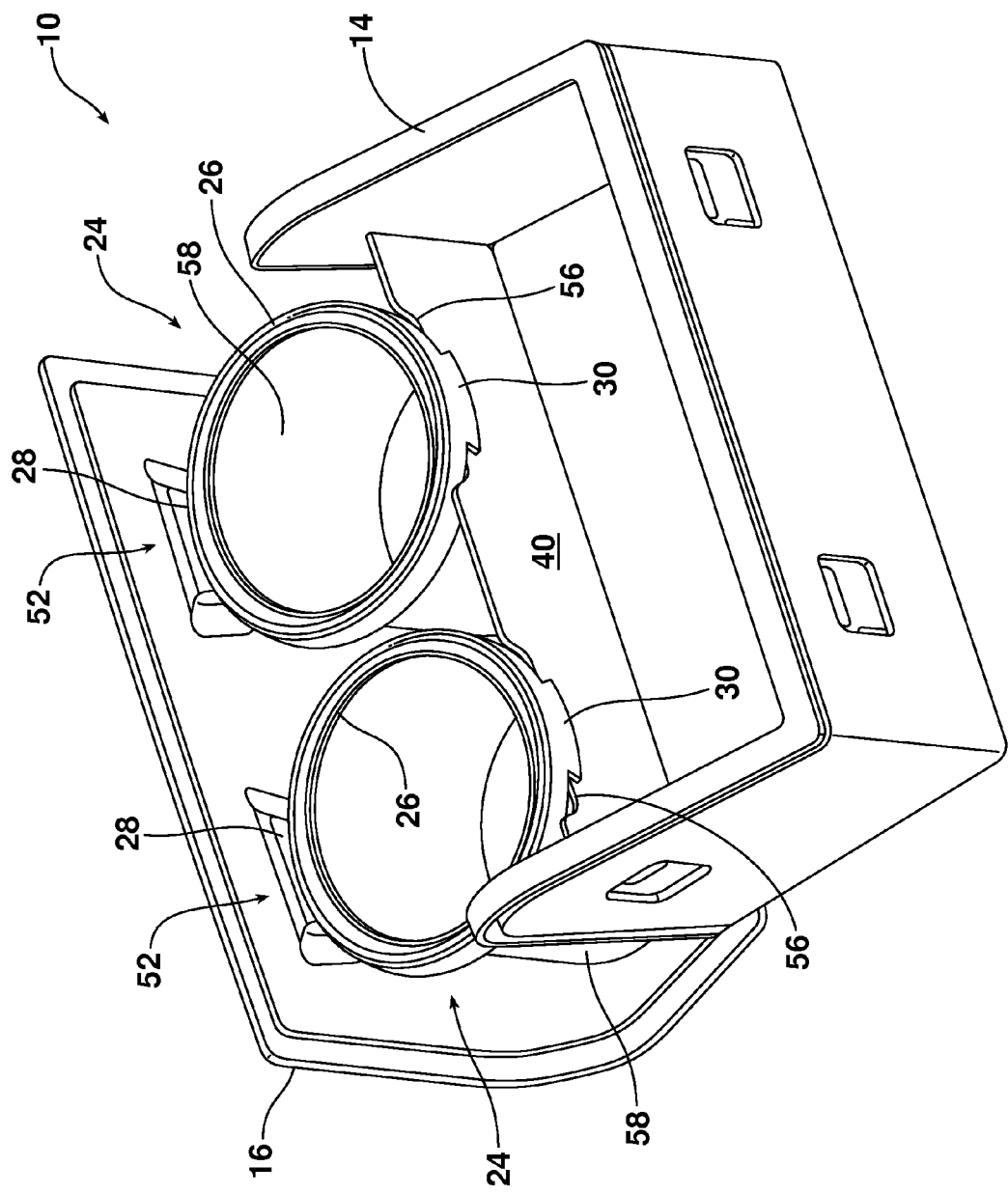
FIG. 6 is a perspective view illustrating two cup holders in the use position.

As illustrated in FIGS. 5 and 6, two additional mounting features 52 are provided on the inner face or surface of the cover 16. Each mounting feature 52 comprises a tapered U-shaped rib 54 corresponding in size and shape to the tapered U-shaped ribs 36 of the mounting features 34.

When desired, one or both of the cup holders 24 may be placed into a first use position in the storage bin 12 (note, for example, FIGS. 2 and 5). In this use position, the first mounting lug 28 of each cup holder 24 is secured in a mounting feature 52 on the cover 16 with the second mounting lug 30 extending over and engaging a notch 56 in the top edge of the support wall 40. In this way, each cup holder 24 is supported at opposed points defined by the mounting lugs 28, 30 so as to better provide stability and support for a cup received within the rim 26 of the cup holder 24.

Reference is now made to FIGS. 5 and 6 that clearly show this two point connection. More specifically, FIG. 5 shows one cup holder 24 in the use position extending between the mounting feature 52 on the cover 16 and the notch 56 on the internal support wall 40 and the other cup holder still locked in the storage position in the storage compartment 42 between the support wall 40 and the wall 32. In contrast, FIG. 6 shows both cup holders 24 in the use position. As should be further appreciated from reviewing FIGS. 5 and 6, the cup holders 24 in this FIG. 6 embodiment, include an optional well 58 depending from the rim 26. In the illustrated embodiment, each well 58 is formed from a flexible cloth or other water proof material.

Figure 7:
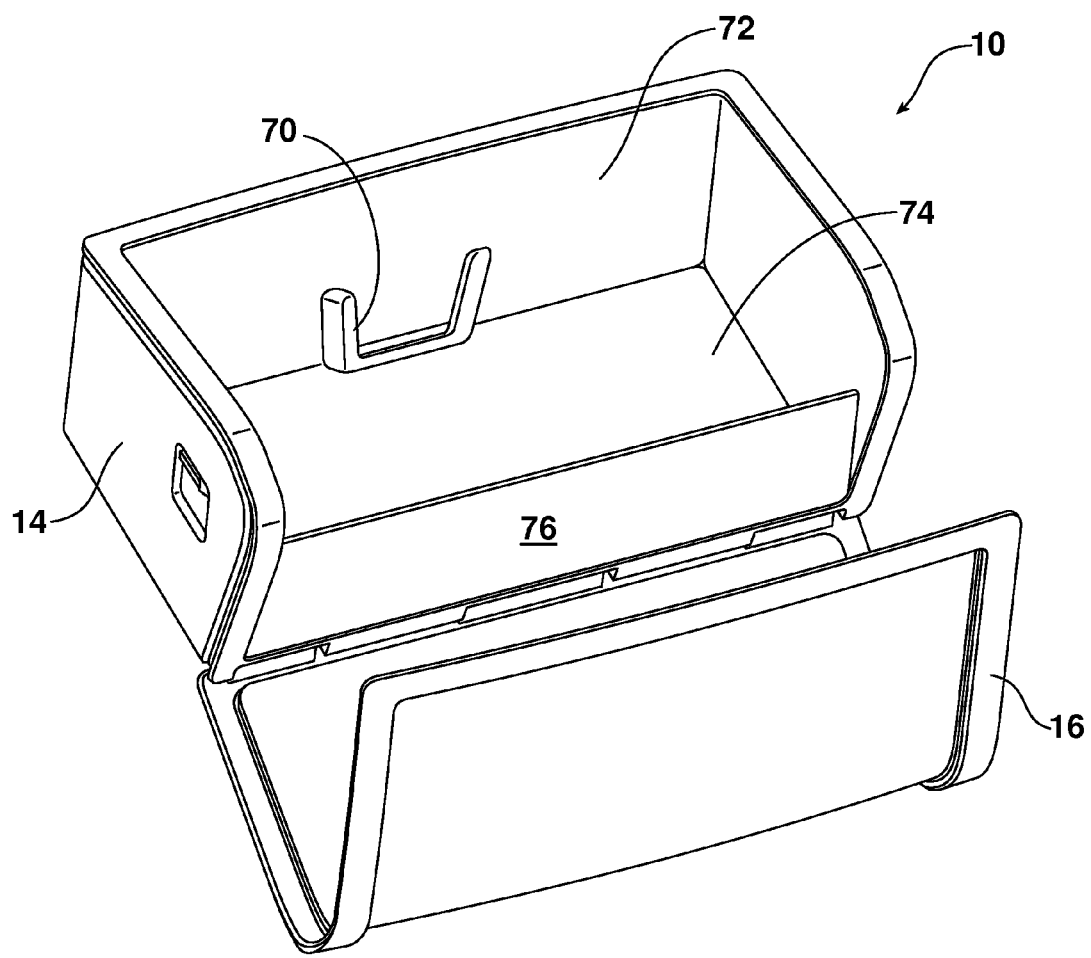
FIGS. 7-9 are perspective views illustrating an alternative embodiment of the cup holder system wherein the cup holder comprises a rim incorporating two semicircular portions connected by a slot and a flexible cloth material forms a well depending from the rim.
Figure 8:
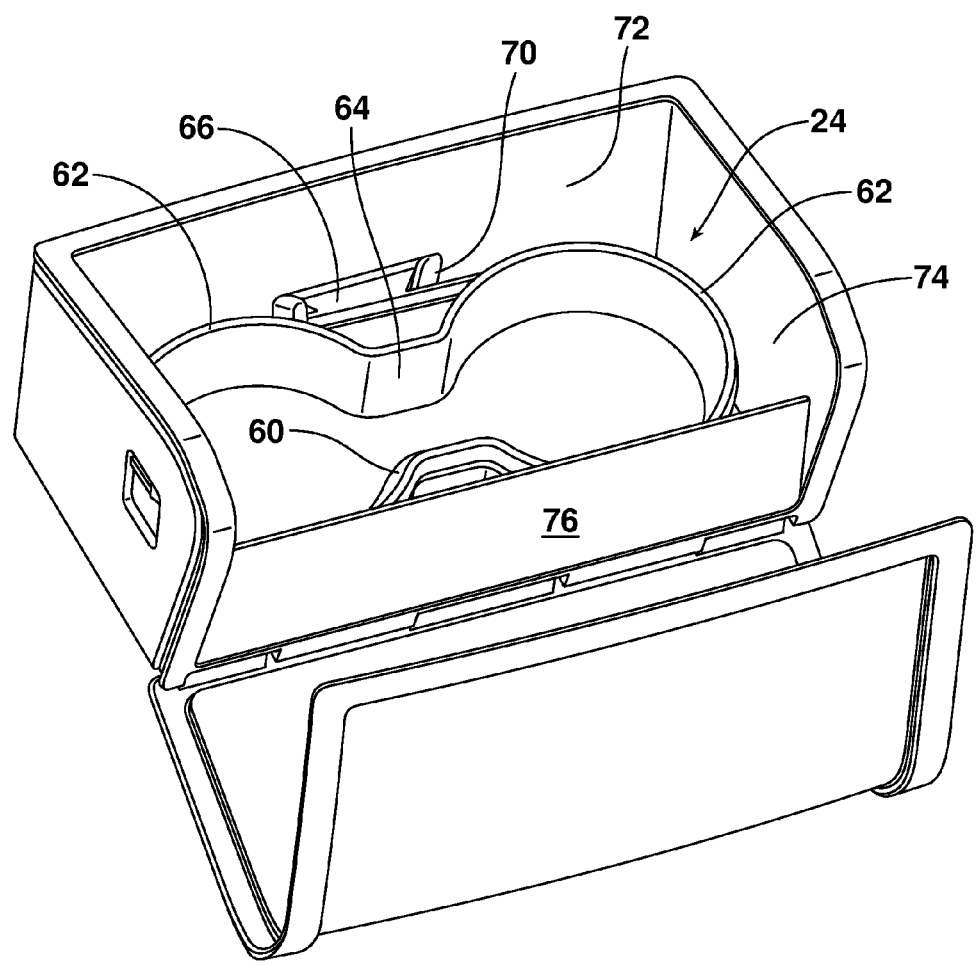
Figure 9:
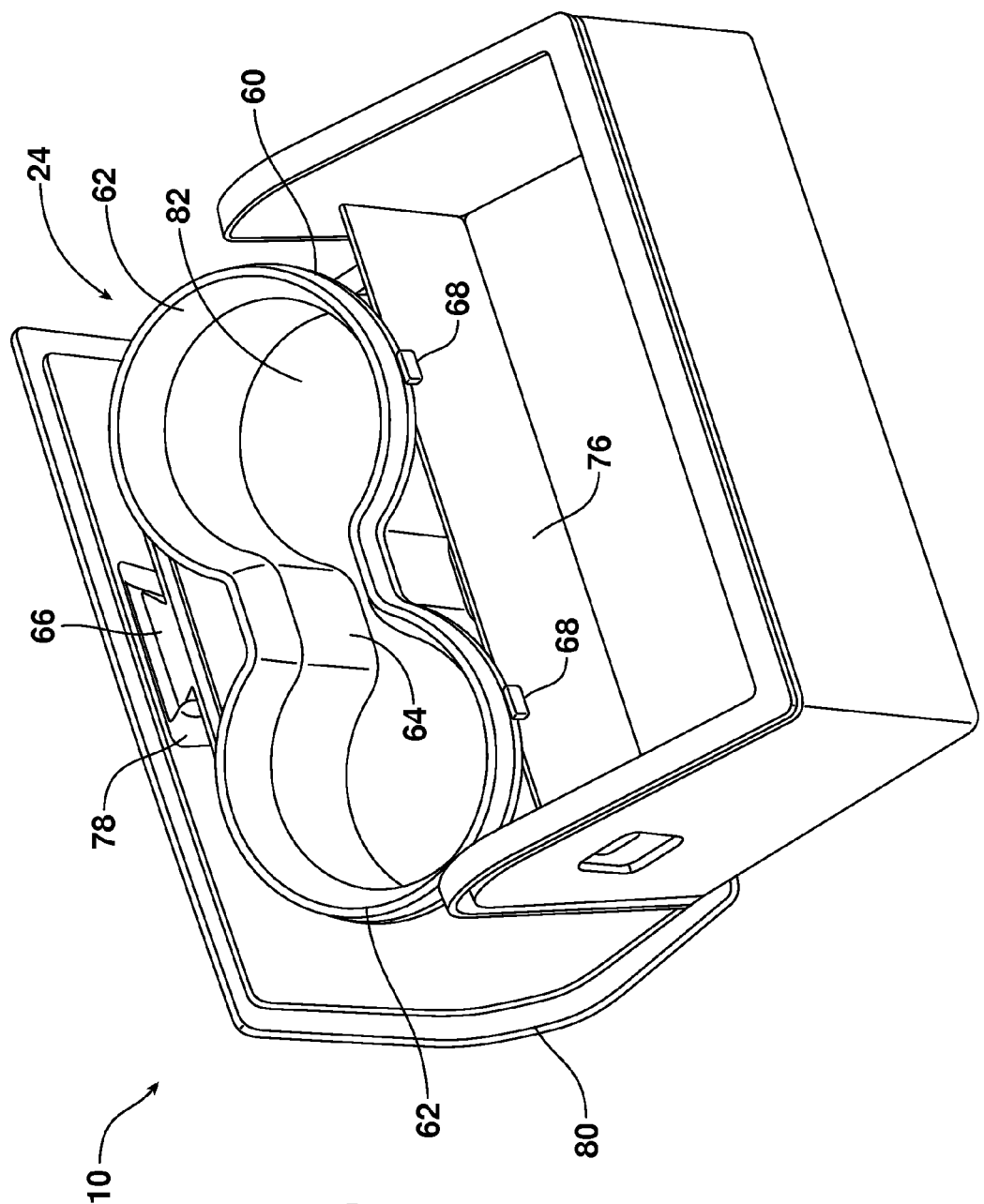
Figure 10:
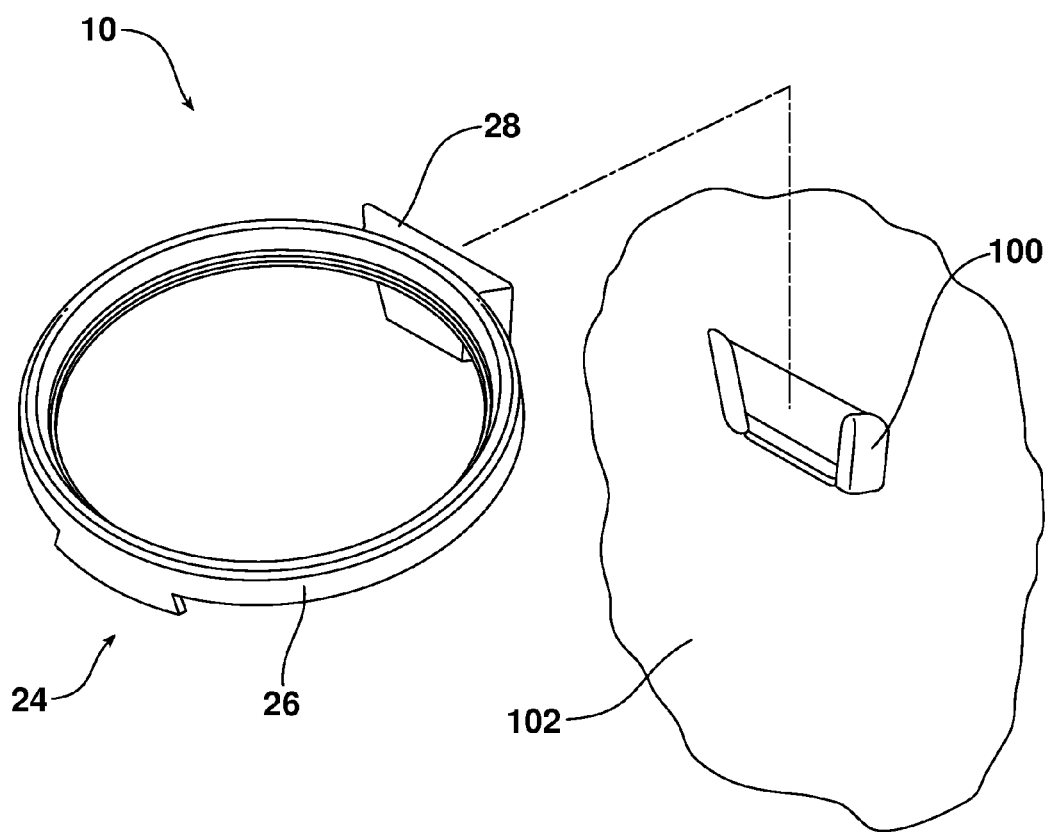
FIG. 10 is a perspective view illustrating the second mounting feature at a second location in the motor vehicle outside the storage bin for receiving and holding the cup holder in a second use position.
Figure 11:
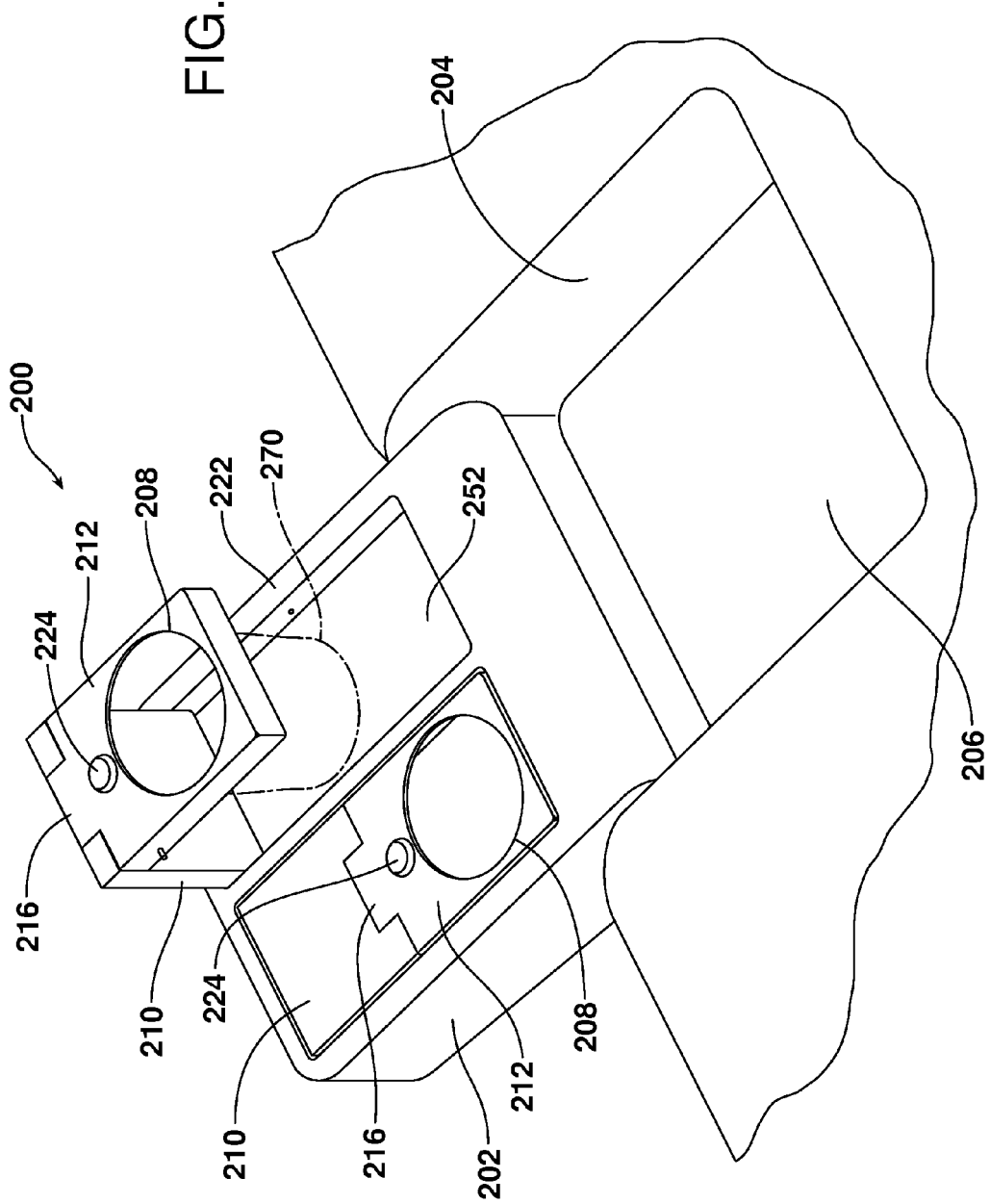
FIG. 11 is a perspective view of yet another embodiment with the cover of the storage bin in the open position, the cup holder on the right in the erected or use position and the cup holder on the left in the storage position.

Reference is now made to FIGS. 7-9 illustrating yet another embodiment of the cup holder system 10. In this embodiment, the cup holder 24 comprises a rim 60 including two semicircular portions 62 connected together by a slot portion 64 that provides clearance for receiving a handle on a mug when a mug is held in the cup holder 24. The rim 60 includes a first mounting lug 66 and two opposed second mounting lugs 68. The mounting lug 66 includes a dovetail margin adapted to be received in the mounting feature 70 on the wall 72 so that the cup holder 24 may be held in the storage position at the bottom of the compartment 74 between the wall 72 and the internal support wall 76 (see FIGS. 7 and 8). Alternatively, as illustrated in FIG. 9, the mounting lug 66 may be received in the mounting feature 78 on the inner wall of the cover 80 with the mounting lugs 68 engaging the top edge of the internal wall 76 to hold the cup holder 24 in the use position. As illustrated in FIG. 9, the cup holder 24 may also include the optional well 82 made of flexible cloth or other appropriate material It should be appreciated that the cup holder system 10 described to this point provides far more versatility and is far more useful than standard seat mounted cup holders that are actually fixed to the seat. More specifically, as illustrated in FIG. 10, the cup holder system 10 includes one or more additional mounting features 100 that are secured at a second location in the motor vehicle outside the storage bin 12. Thus, as illustrated, the mounting feature 100 is positioned on a surface 102 at a convenient point in the motor vehicle. That surface 102 may be part of, for example, a door of the motor vehicle such as the door trim. Alternatively, that surface 102 may be part of the console of the motor vehicle such as the rear face of the center console extending between the front seats. In yet another alternative, that surface 102 may be part of a seat such as the front seat of the vehicle including, for example, the rear face or a side face of the seat. In yet another possible embodiment that surface 102 may be an interior trim component of the motor vehicle such as, for example, a trim cover for an A, B or C pillar. In use, the cup holder 24 is removed from the storage bin 12. The mounting feature 100 corresponds in size and shape to the mounting features 78, 70, 52 and 34 found in the previously described storage bin 12. Thus, the cup holder 24 may be easily connected to the mounting feature 100 by inserting the tapered dovetail margin of the mounting lug 28, 66 into the mounting feature 100 thereby allowing the user to position the cup holder in the motor vehicle at a convenient access point that is easily in reach. This is true even when the rear seat of the vehicle is occupied by three people and the cover 16 of the storage bin 12 has been closed to provide a full seating surface in the middle of the rear seat for the third, middle seat occupant.

Reference is now made to FIGS. 11-13b which illustrate yet another embodiment of cup holder system 200. Cup holder system 200 comprises a storage bin including a cover 202 connected by a hinge to a housing 204 including a storage compartment 206.

Two articulated cup holders 208 are provided on the cover 202. Each cup holder 208 includes a first section 210 and a second section 212. A first hinge 214 connects the first section 210 to the cover 202 while a second hinge 216 connects the second section 212 to the first section 210. A lock mechanism, generally designated by reference numeral 220 secures each articulated cup holder 208 in the storage position wherein the articulated cup holder is held in a recess in the cover 202 formed by the facing 222.

Figure 13A:
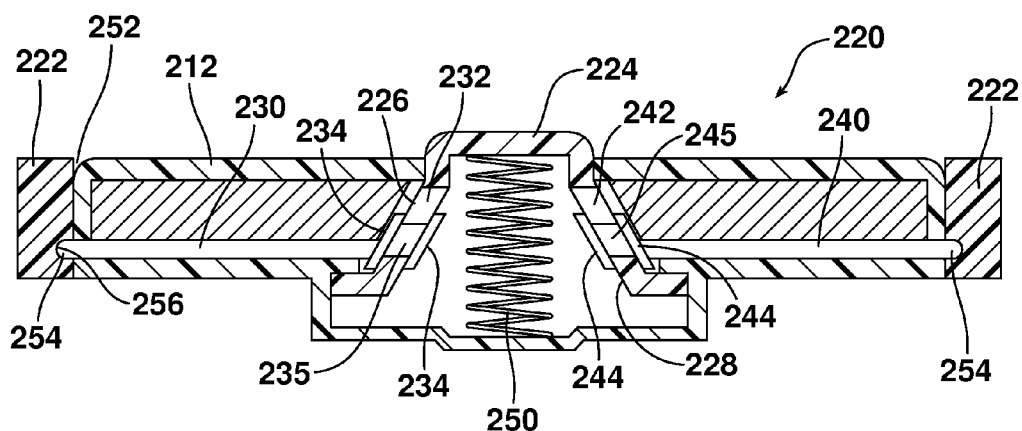
FIGS. 13a and 13b are schematic cross sectional views illustrating the cup holder lock mechanism in respective locked and unlocked positions.
Figure 13B:
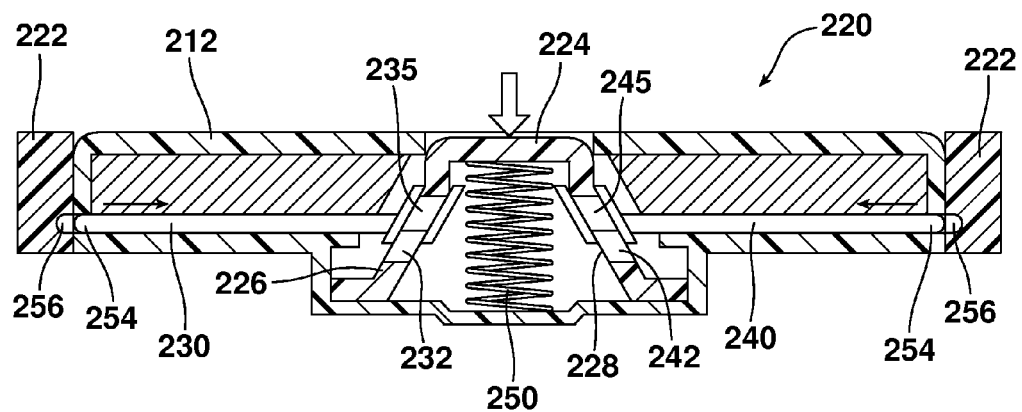

As best illustrated in FIGS. 13a and 13b, each lock mechanism 220 comprises an actuator button 224 having first and second opposed sidewalls 226, 228. A first latch pin 230 is slidingly received in a first elongated slot 232 in the first sidewall 226. Cooperating flanges 234 define a guide 235 at a proximal end of the latch pin 230 and engage the margins of the sidewall 226 around the slot 232 and hold the pin in the slot. Similarly, a second latch pin 240 is slidingly received in a second elongated slot 242 in the second sidewall 228. Cooperating flanges 244 define a guide 245 at a proximal end of the latch pin 240 and engage the margins of the sidewall 228 around the slot 242 and hold the pin in the slot.

As illustrated, the first and second opposed sidewalls 226, 228 diverge from each other from top to bottom so that when the actuator button 224 is depressed, the latch pins 230, 240 ride in the diverging slots and are drawn together. When the actuator button 224 is released, the spring 250 biases the actuator button upwardly causing the latch pins 230, 240 to be forced apart again.

Figure 12A:
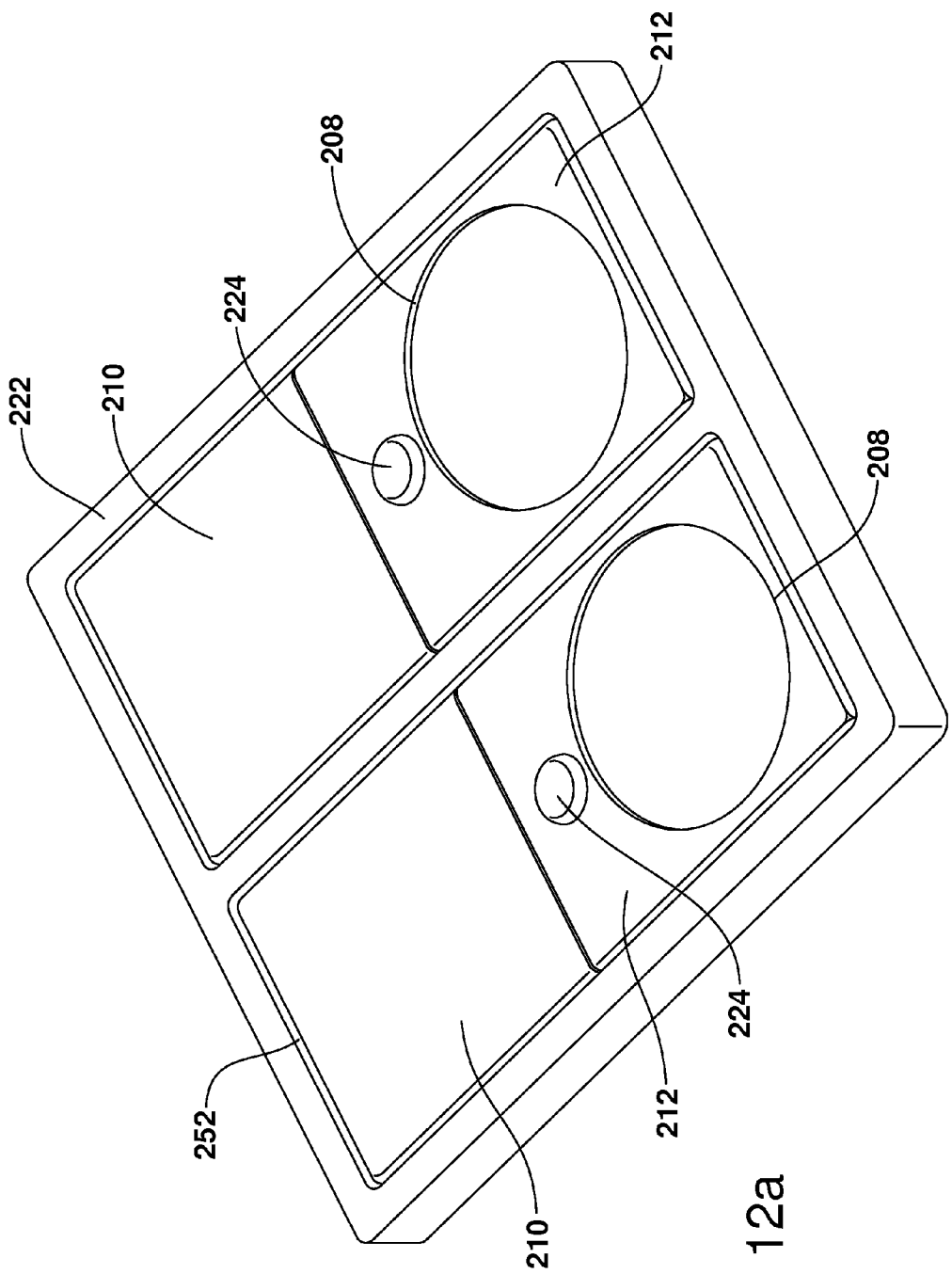
FIGS. 12a and 12b illustrate the twin cup holders in respective storage and use positions.

Reference is now made to FIGS. 12a and 13a illustrating the cup holders 208 in the storage position. As illustrated, the two sections 210, 212 of each cup holder 208 are aligned together in a first plane lying flat within the recess 252 of the cover 202 formed by the facing 222. The distal ends 254 of the opposed latch pins 230, 240 are engaged in cooperating locking apertures 256 in the facing 222 of the cover 202 thereby securing the cup holders 208 in the storage position.

Figure 12B:
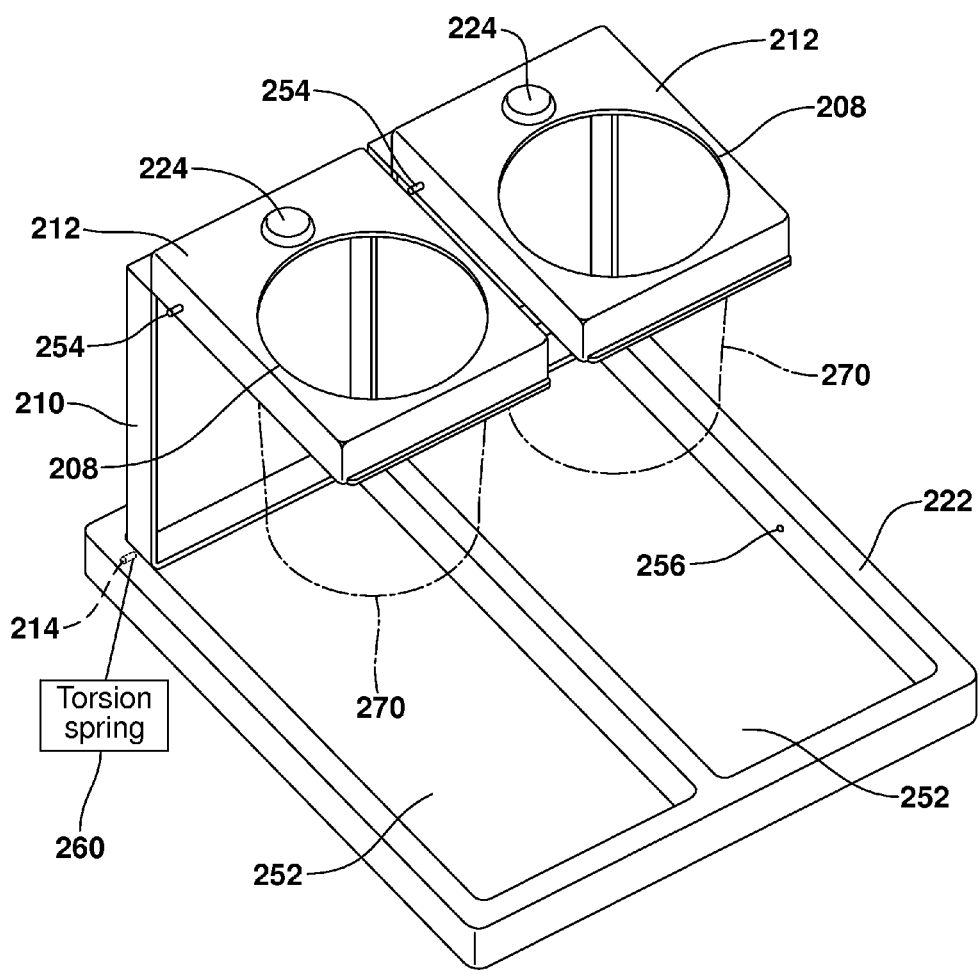

Reference is now made to FIGS. 12b and 13b illustrating the cup holders 208 in the erected, deployed or use position. In this position, the first section 210 of each cup holder 208 rests in a second plane substantially perpendicular to the first plane and the second section 212 of each cup holder rests in a third plane offset from and parallel to the first plane.

In order to displace a cup holder 208 from the storage position to the use position, one need only depress the actuator button 224 on the second section 212 of the cup holder. When this is done, the opposed latch pins 230, 240 are drawn together and the distal ends 254 of those pins are withdrawn from the locking apertures 256 in the facing 222. A torsion spring 260 at the first hinge 214 then biases the first section 210 into the second or vertical plane. This movement simultaneously causes the second section 212 to move into the third plane above the facing 222. Stops (not shown) on the first and second sections 210, 212 hold the sections in the desired, use position.

When one wishes to return a cup holder 208 to the storage position, one simply pivots the cup holder downwardly about the first hinge 214 until the cup holder is again seated flat in the first plane within the recess formed by the facing 222. At that point, the distal ends 254 of the opposed latch pins 230, 240 are again received in the locking apertures 256 to secure the cup holder 208 in the storage position. If the cup holders 208 include the optional wells 270 made of a flexible cloth material, it should be appreciated that those wells fold and collapse so as to be readily received in the underlying recess 252.

The foregoing has been presented for purposes of illustration and description. It is not intended to be exhaustive or to limit the embodiments to the precise form disclosed. Obvious modifications and variations are possible in light of the above teachings. For example, the locking pins 230, 240 could slide in a track or groove formed in the actuator 224 via a trunnion or pin if desired. All such modifications and variations are within the scope of the appended claims when interpreted in accordance with the breadth to which they are fairly, legally and equitably entitled.

What is claimed:

1. A cup holder system for a motor vehicle, comprising:
a storage bin including a housing and a cover;
a cup holder;
a first mounting feature in said storage bin for receiving and holding said cup holder in a first use position; and
a second mounting feature at a second location in the motor vehicle outside said storage bin for receiving and holding said cup holder in a second use position,
whereby the first mounting feature corresponds in size and shape to the second mounting feature.

2. The cup holder system of claim 1, further including a third mounting feature in said storage bin for receiving and holding said cup holder in a storage position.

3. The cup holder system of claim 2, wherein said first mounting feature is provided on said cover and receives and holds said cup holder in said first use position and said third mounting feature is provided on said housing and receives and holds said cup holder in said storage position within a compartment defined by said cover and said housing.

4. The cup holder system of claim 3, wherein said cover is connected by a hinge to said housing, said cover being displaceable between an open position and a closed position.

5. The cup holder system of claim 4, wherein said cup holder comprises a rim and a flexible well for receiving and holding a cup.

6. The cup holder system of claim 5, wherein said rim includes a circular portion and a slot, said slot providing clearance for receiving a handle on a mug when the mug is held in said cup holder.

7. The cup holder system of claim 6, wherein said storage bin includes an internal support wall.

8. The cup holder system of claim 7, wherein said support wall includes a notch and said cup holder is supported between said first mounting feature and said support wall.

9. The cup holder system of claim 8, wherein said cup holder includes first and second mounting lugs, said first mounting lug engaging said first mounting feature and said second mounting lug engaging said notch in said support wall.

10. The cup holder system of claim 9, wherein said first mounting lug is formed as a tapered dovetail and said first, second and third mounting features are formed as cooperating tapered dovetail receivers.

11. The cup holder system of claim 2, wherein said third mounting feature includes a resilient lock for positively holding said cup holder in said storage position within a compartment defined by said cover and said housing.

12. A cup holder system for a motor vehicle, comprising:
a storage bin including a cover and a housing defining a storage compartment;
a cup holder;
a first mounting feature in said storage bin for receiving and holding said cup holder in a use position, said first mounting feature having a tapered U-shaped rib; and
a second mounting feature in said storage bin for receiving and holding said cup holder in a storage position.

13. A cup holder system for a motor vehicle, comprising:
a storage bin including a housing and a cover;
a cup holder;
a first mounting feature in said storage bin for receiving and holding said cup holder in a first use position;
a second mounting feature at a second location in the motor vehicle outside said storage bin for receiving and holding said cup holder in a second use position; and
a third mounting feature in said storage bin for receiving and holding said cup holder in a storage position, wherein said first mounting feature is provided on said cover and receives and holds said cup holder in said first use position and said third mounting feature is provided on said housing and receives and holds said cup holder in said storage position within a compartment defined by said cover and said housing.

* * * * *